US012417270B2

(12) United States Patent
Schnieders et al.

(10) Patent No.: US 12,417,270 B2
(45) Date of Patent: Sep. 16, 2025

(54) METHOD AND SYSTEM FOR AUTHENTICATING A USER

(71) Applicant: Deutsche Telekom AG, Bonn (DE)

(72) Inventors: Dominik Schnieders, Aachen (DE); Stephan Spitz, Karlsfeld (DE); Hermann Geupel, Munich (DE)

(73) Assignee: DEUTSCHE TELEKOM AG, Bonn (DE)

( * ) Notice: Subject to any disclaimer, the term of this patent is extended or adjusted under 35 U.S.C. 154(b) by 507 days.

(21) Appl. No.: 17/868,812

(22) Filed: Jul. 20, 2022

(65) Prior Publication Data

US 2023/0022561 A1 Jan. 26, 2023

(30) Foreign Application Priority Data

Jul. 22, 2021 (EP) ..................................... 21187285

(51) Int. Cl.
*G06F 21/32* (2013.01)
*G06V 40/16* (2022.01)

(52) U.S. Cl.
CPC ............ *G06F 21/32* (2013.01); *G06V 40/168* (2022.01); *G06V 40/172* (2022.01)

(58) Field of Classification Search
CPC .... G06F 21/32; G06V 40/168; G06V 40/172; G06V 40/161; G06V 40/40
See application file for complete search history.

(56) References Cited

U.S. PATENT DOCUMENTS

| | | | |
|---|---|---|---|
| 8,983,207 B1 | 3/2015 | Ran et al. | |
| 2013/0070973 A1* | 3/2013 | Saito | G06V 10/993 |
| | | | 382/118 |
| 2013/0246264 A1* | 9/2013 | Lucas | G06Q 40/02 |
| | | | 705/42 |
| 2018/0260553 A1* | 9/2018 | Hoyos | G06Q 20/40145 |
| 2021/0011986 A1* | 1/2021 | Tussy | G06V 40/67 |
| 2023/0300173 A1* | 9/2023 | Roach | H04L 63/0853 |
| | | | 726/4 |

* cited by examiner

*Primary Examiner* — Sj Park
*Assistant Examiner* — Caroline E. Depalma
(74) *Attorney, Agent, or Firm* — LEYDIG, VOIT & MAYER, LTD.

(57) ABSTRACT

A method for authenticating a user includes: an application frontend of a face recognition application, upon receipt of a face recognition request from an application backend of the face recognition application, causes a terminal device to activate a camera of the terminal device; the application frontend receives a video stream of a face of the user captured by the camera of the terminal device; the application frontend transmits the received video stream to the application backend; the application backend, upon receipt of the video stream, extracts a face characteristic of the user from the received video stream in real-time; and the application backend compares the extracted face characteristic with a stored reference face characteristic of the user and authenticates the user based on the extracted face characteristic matching the stored reference face characteristic.

14 Claims, 1 Drawing Sheet

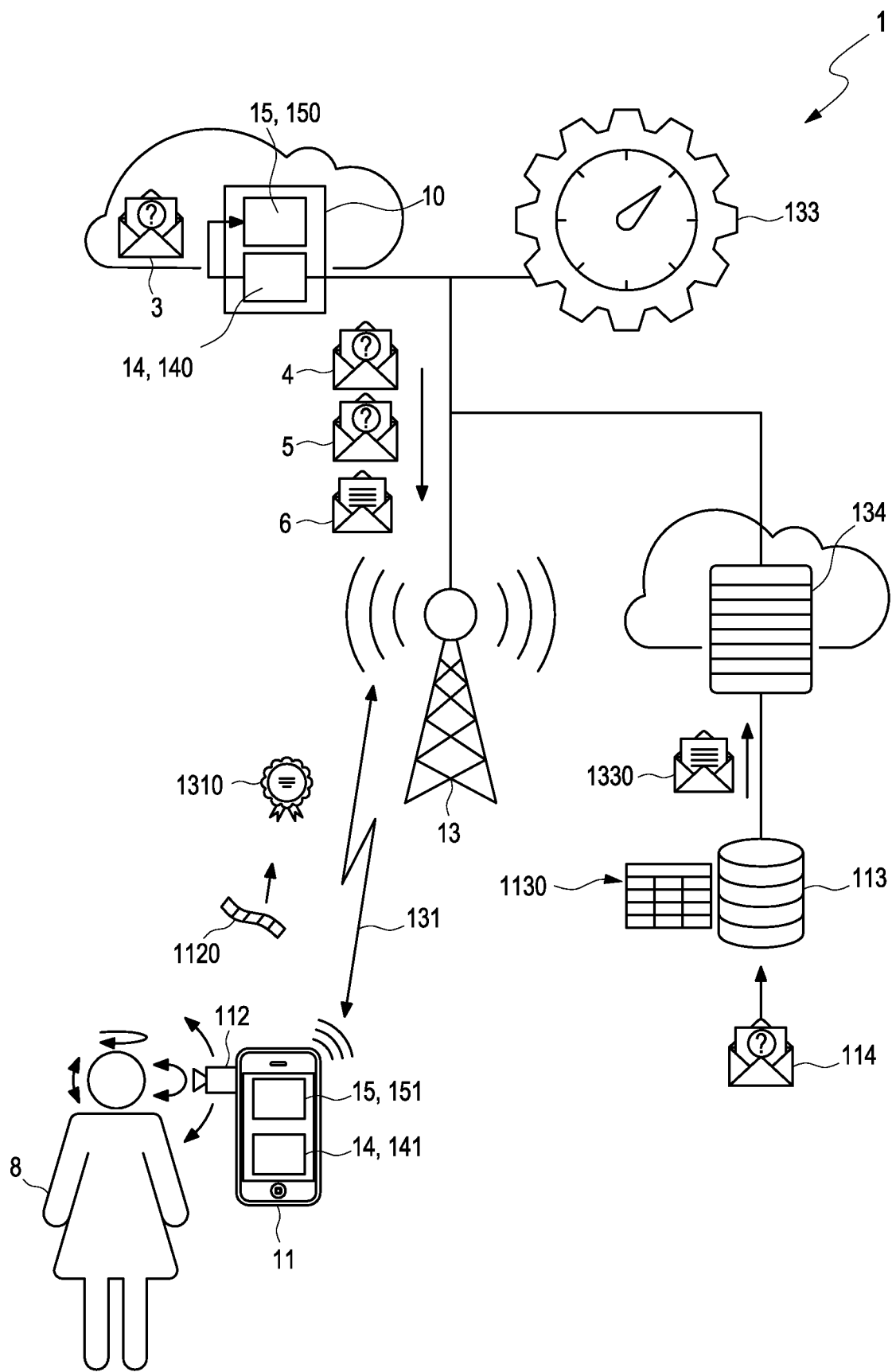

METHOD AND SYSTEM FOR AUTHENTICATING A USER

CROSS-REFERENCE TO PRIOR APPLICATIONS

This application claims benefit to European Patent Application No. EP 21 187 285.8, filed on Jul. 22, 2021, which is hereby incorporated by reference herein.

FIELD

The invention relates to a method for authenticating a user. The method comprises the following steps: an application frontend of a face recognition application is executed by a terminal device of a user and receives a video stream of a face of the user captured by a camera of the terminal device; the application frontend immediately transmits the received video stream to an application backend of the face recognition application; the application backend, upon receipt of the video stream, extracts a face characteristic of the user from the received video stream in real time; the application backend compares the extracted face characteristic with a stored reference face characteristic and authenticates the user when the extracted face characteristic matches the stored reference face characteristic. Furthermore, the invention relates to a face recognition application and a system for authenticating a user.

BACKGROUND

Different methods for authenticating a user belong to the state of the art and generally comprise comparing individual data provided by the user upon an authentication request with stored reference data provided by the user in advance. Exemplary methods rely on a personal identification number (PIN) entered by the user or a fingerprint of the user captured by a fingerprint sensor. These methods are secure as long as the user exclusively knows the personal identification number or the fingerprint sensor is not bypassed or a real finger is sensed instead of a fingerprint copy.

For many relevant applications, particularly for a transaction application (e.g. a payment application), a higher authentication security level is very desirable which, however, is still required to be achieved by the user easily.

SUMMARY

In another exemplary embodiment, the present invention provides one or more non-transitory computer readable mediums having processor-executable instructions stored thereon for a face recognition application, wherein the face recognition application comprises an application frontend to be executed by a terminal device and an application backend to be executed by a backend server located remote from the terminal device and to be connected to via a communication network. The processor-executable instructions, when executed, facilitate: the application frontend, upon receipt of a face recognition request from the application backend, causes the terminal device to activate a camera of the terminal device; the application frontend receiving a video stream of a face of a user captured by the camera of the terminal device; the application frontend transmitting the received video stream to the application backend; the application backend, upon receipt of the video stream, extracting a face characteristic of the user from the received video stream in real-time; and the application backend comparing the extracted face characteristic with a stored reference face characteristic of the user and authenticating the user based on the extracted face characteristic matching the stored reference face characteristic.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a system according to the invention for authenticating a user.

DETAILED DESCRIPTION

Exemplary embodiments of the invention provide a method for authenticating a user which, on the one hand, provide a very high security level of the authentication and, on the other hand, can be carried out substantially as easily as can known authentication methods.

A first aspect of the invention is a method for authenticating a user, wherein an application frontend of a face recognition application is executed by a terminal device of a user and receives a video stream of a face of the user captured by a camera of the terminal device; the application frontend immediately transmits the received video stream to an application backend of the face recognition application; the application backend, upon receipt of the video stream, extracts a face characteristic of the user from the received video stream in real time; the application backend compares the extracted face characteristic with a stored reference face characteristic of the user, and authenticates the user when the extracted face characteristic matches the stored reference face characteristic.

The application frontend and the application backend very closely cooperate in order to allow for the application backend to extract the face characteristic in real time. As compared with an image, the video stream allows an advanced face characteristic for being extracted (e.g. an evolving facial expression or a three-dimensional shape of the face). Such an advanced face characteristic cannot be extracted from a single image. Hence, a security level achieved due to the advanced face characteristic strongly exceeds a security level achievable with a traditional image-based authentication method.

Particularly, a stereoscopic camera may simultaneously capture two video streams from different viewing angles. Each video stream being two-dimensional, the two video streams may together be considered a three-dimensional video stream as the two video streams each explicitly comprise two-dimensional information of the face and together implicitly comprise additional depth information of the face.

However, extracting the face characteristic, particularly the advanced face characteristic, from the video stream requires an enormous computational power and consumes a large amount of electric energy.

According to the invention, the application backend is executed by a backend server located remote from the terminal device. The application frontend, upon receipt of a face recognition request transmitted by the application backend, causes the terminal device to activate the camera and transmits the received video stream via a connection provided by a communication network. The face recognition application is a distributed application with an application backend and an application frontend which are executed on different devices arranged distant from each other, i.e. the backend server and the terminal device, respectively. In other words, elaborate calculations consuming computational and electric power are carried out by the backend server instead of the terminal device. The terminal device is in essence used as a camera device.

On the one hand, the elaborate calculations required for increasing the security level of the authentication exceed a computational power of the terminal device but may be readily executed by the backend server instead. On the other hand, capturing a video stream is almost as simple to accomplish as capturing an image. Accordingly, the invention provides for an increased security level in combination with a hardly more complicated execution of the authentication.

The face characteristics are advantageously extracted by an artificial intelligence, i.e. the application backend comprises an artificial neural network, particularly a convolutional neural network trained for face recognition.

Preferably, the application backend extracts a two-dimensional face characteristic and/or a three-dimensional face characteristic from the video stream. Of course, the video stream comprises a sequence of images. Each single image may be used for extracting traditional face characteristics while each at least partial sequence of images may be used for extracting an advanced face characteristic.

The reference face characteristic is advantageously extracted from a reference video stream captured in advance. Thus, the reference face characteristic is generated the same way as is the extracted face characteristic. Accordingly, no particular or additional action is required for initially generating the reference face characteristic.

In an embodiment, the application backend extracts a plurality of face characteristics simultaneously. The more face characteristics are extracted the higher is the security level of the authentication.

The application frontend may cause the terminal device to display an instruction instructing the user to perform a required movement of the face relative to the camera of the terminal device. The instruction guides the user in providing the captured video stream in accordance with a requirement related to or associated with the face characteristic to be extracted for authentication. Instructions may be repeatedly displayed until the transmitted video stream meets the requirements of face recognition, i.e. allows for extracting the required face characteristic.

The application backend advantageously transmits an instruction request comprising the instruction to the application frontend via the connection and the application frontend causes the terminal device to display the instruction upon receipt of the instruction request. The application backend continuously tries to extract the required face characteristic. When a required face characteristic cannot be extracted, the application backend keeps on transmitting instructions until the user exits face recognition and, therewith, authentication or a time-out is reached or extraction of each required face characteristic has been successfully accomplished.

In an embodiment, matching comprises exceeding a predetermined minimum similarity of the extracted face characteristic and the stored reference face characteristic. The predetermined minimum similarity may be based on calculating differences of pairs of corresponding extracted face characteristics and stored reference face characteristics. The predetermined similarity may apply a threshold on each calculated difference or on a sum of absolute values or squares of the calculated differences. The predetermined similarity may apply an individual weight to each calculated differences before summing and applying the threshold.

In a preferred embodiment, a core server of the communication network, upon transmission of the video stream, selects a quality service for the face recognition application and retrieves data related to the quality service from a quality booking database depending on an IP address of the application backend.

The quality service is a service of the communication network for managing the service quality (i.e. quality of service (QoS)) of the connection provided by the communication network. The quality service may also communicate with the application backend and the application frontend in order to adjust the service quality adequate for a constellation and/or an actual load of the communication network.

The quality booking database comprises one or more entries each entry comprising an IP address of an application backend of a distributed application, particularly a face recognition application, a quality service of the communication network and data related to the quality service indicating a service quality booked for the distributed application.

Each entry in the quality booking database may be created in advance upon an application quality booking request. Ideally, the application provider providing the face recognition application, in advance, books a service quality for the face recognition application via the quality booking request before the face recognition application is executed for the first time. However, the application provider, even after the first execution of the face recognition application, may readily book or change the service quality for the face recognition application.

The communication network advantageously applies a service quality determined by the selected quality service to the connection and the face recognition application is operated with the applied service quality. The face recognition application, thus, is provided with a service quality adequate for transmitting the video stream without any jerking or skipping. The applied service quality guarantees a continuous and smooth transmission of the video stream.

Applying the service quality may comprise assigning a maximum latency, a minimum bitrate or a combination of a maximum latency and a minimum bitrate to the connection and/or causing the application frontend of the face recognition application to adjust a data rate of the transmitted video stream corresponding to the applied service quality. The maximum latency is a guaranteed latency which is not exceeded by the connection. The minimum bitrate is a guaranteed bitrate (GBR) which is at least supported by the communication.

Another way for guaranteeing a continuous and smooth transmission of the video stream requires the face recognition application to receive control data concerning a service quality actually applied by the communication network and to adjust the data rate of the video stream (e.g. a frame rate of the video stream), a compression rate of the video stream, a zoom rate of the video stream (i.e. a section size), a resolution of the video stream, a dimension of the video stream or the like, to the applied service quality in real time.

Accordingly, an artificial intelligence comprised by the application backend comprises a plurality of face recognition models each face recognition model corresponding to a different service quality and selects the face recognition model to compare with in real time depending on the service quality actually applied. The artificial intelligence, of course, is trained in advance at a corresponding plurality of different service qualities.

The face recognition models comprise both two-dimensional and three-dimensional models which are selected by the artificial intelligence in real time depending on the dimension of the received video stream. The artificial intelligence is trained in advance on two-dimensional video streams and three-dimensional video streams.

As a result, the face recognition application may adjust a data rate of the video stream corresponding to the service quality applied to the connection.

The quality of service may accelerate the completion of the face recognition and, at the same time, may effectively reduce a jitter of the connection. The predetermined service quality allows for a short response time when completing the face recognition which further increases the acceptance of the method.

In an embodiment, a transaction application, for each transaction, for a random transaction out of a plurality of transactions or for a suspicious transaction, transmits an authentication request to the application backend of the face recognition application, and the application backend of the face recognition application transmits the face recognition request upon receipt of the authentication request. The transaction application (e.g. a payment application) may also be a distributed application. Particularly, the application backend of the face recognition application may be a module of the application backend of the transaction application, and the application frontend of the face recognition application may be a module of the application frontend of the transaction application.

In a favorable embodiment, the application backend transmits an authentication result to the application frontend via the connection and the application frontend, upon receipt of the authentication result, causes the application frontend to stop transmitting the video stream. The authentication result may comprise an authentication success (i.e. the extracted face characteristic matches the stored reference face characteristic). The authentication result may comprise an authentication failure (i.e. the extracted face characteristic does not match the stored reference face characteristic). In either case, capturing and transmitting of the video stream is stopped.

In many embodiments, the connection is provided by a radio access network or a wired network as the communication network. Radio access networks (RAN) (e.g. cellular networks or wireless local area networks (WLAN)) are very common communication networks. The wired network may be configured as an Ethernet network or the like.

Preferably, the face recognition application is operated using a cellular network as the radio access network and the edge cloud server is located close to a radio cell of the cellular network the terminal device is arranged in. The cellular network allows for carrying out the method practically at any place and, hence, strongly improves applicability of the method.

In a preferred embodiment, an edge cloud server located close to the terminal device executes the application backend as the backend server. The edge cloud server is arranged in a vicinity (i.e. in a spatial vicinity and/or in a logical vicinity) of the terminal device and, hence, allows for a particularly low round trip time (RTT) in completing the face recognition which further increases ease and acceptance of the method.

A second aspect of the invention is a face recognition application, comprising an application frontend to be executed by a terminal device and an application backend. The face recognition application allows for authenticating a user and, thus, may be applied whenever a user authentication is required.

According to the invention, the application backend is configured for being executed by a backend server located remote from the terminal device and to be connected to via a communication network and the face recognition application is configured for carrying out a method according to the invention, particularly together with a core server of the communication network. The face recognition application allows for a user to be authenticated with a higher security and for a user authentication to be accomplished essentially as easily as a traditional image-based user authentication.

A third aspect of the invention is a system for authenticating a user, comprising a face recognition application according to the invention and having an application frontend and an application backend and a terminal device for executing the application frontend.

According to the invention, the system comprises a backend server for executing the application backend and a communication network for providing a connection of the terminal device to the backend server, wherein the terminal device, the application frontend, the backend server, the application backend and the communication network are configured for together carrying out a method according to the invention. The system allows for a user to be authenticated with a higher security and for a user authentication to be accomplished essentially as easily as a traditional image-based user authentication.

It is an advantage of the invention that a user is authenticated with a higher authentication security. Another advantage of the invention is that user authentication is accomplished essentially as easily as a traditional image-based user authentication.

It shall be understood that the features described previously and to be described subsequently may be used not only in the indicated combinations but also in different combinations or on their own without leaving the scope of the present invention.

The invention is described in detail by means of two exemplary embodiments and with reference to the drawings. Like components are indicated by like reference numerals throughout the drawings.

FIG. 1 schematically shows an entity diagram of a system 1 according to the invention for authenticating a user 8. The system 1 comprises a face recognition application 15 according to the invention. The system 1 further comprises a terminal device 11 for executing an application frontend 151 of the face recognition application 15, a backend server 10 for executing an application backend 150 of the face recognition application 15 and a communication network 13 for providing a connection of the terminal device 11 to the backend server 10.

The backend server 10 is located remote from the terminal device 11 and configured to be connected to via the communication network 13. The communication network 13 may comprise a core server 134.

The face recognition application 15 comprises an application frontend 151 to be executed by the terminal device 11 and an application backend 151 to be executed by the backend server 10.

The terminal device 11, the application frontend 151, the backend server 10, the application backend 150 and the communication network 13 are configured for together carrying out the following method according to the invention for authenticating the user 8. Particularly, the face recognition application 15 is configured for carrying out the method together with the terminal device 11, the backend server 10 and the communication network 13, preferably a core server 134 of the communication network 13.

The application frontend 151 of the face recognition application 15 is executed by the terminal device 11 of the user 8. The application backend 150 of the face recognition application 15 may comprise an artificial neural network trained for face recognition and is executed by the backend server 10.

Preferably, a transaction application 14, for each transaction 2, for a random transaction 2 out of a plurality of transactions 2 or for a suspicious transaction 2, transmits an authentication request 3 to the application backend 150 of the face recognition application 15. However, any other application different from the transaction application 14, may transmit the authentication request 3 to the application backend 150.

The application backend 150, upon receipt of the authentication request 3, transmits a face recognition request 4 to the application frontend 151. The application frontend 151, upon receipt of the face recognition request 4 transmitted by the application backend 150, causes the terminal device 11 to activate the camera 112 and the terminal device 11 activates the camera 112.

The application frontend 151 receives a video stream 1120 of a face of the user 8 captured by the camera 112 of the terminal device 11 and immediately transmits the received video stream 1120 to the application backend 150 via a connection 131 provided by the communication network 13. The connection 131 is preferably provided by a radio access network or a wired network as the communication network 13.

The application backend 150, upon receipt of the video stream 1120, extracts a face characteristic of the user 8 from the received video 1120 stream in real time. The application backend 150 may extract a two-dimensional face characteristic and/or a three-dimensional face characteristic from the video stream 1120. The application backend 150 preferably extracts a plurality of face characteristics simultaneously.

The application backend 150 compares the extracted face characteristic with a stored reference face characteristic of the user 8 and authenticates the user 8 when the extracted face characteristic matches the stored reference face characteristic. The reference face characteristic may be extracted from a reference video stream captured in advance. Matching comprises exceeding a predetermined minimum similarity of the extracted face characteristic and the stored reference face characteristic.

The application frontend 151 may, at any time during the authentication, cause the terminal device 11 to display an instruction instructing the user 8 to perform a required movement of the camera 112 relative to the face or of the face relative to the camera 112, respectively.

Preferably, the application backend 150 transmits an instruction request 5 comprising the instruction to the application frontend 151 via the connection 131 and the application frontend 151 causes the terminal device 11 to display the instruction upon receipt of the instruction request 5.

A core server 134 of the communication network 13, upon transmission of the video stream 1120, may select a quality service 133 for the face recognition application 10 and retrieve data 1120 related to the quality service 133 from a quality booking database 113 depending on an IP address of the application backend 151.

Each entry 1130 in the quality booking database 113 is preferably created in advance upon an application quality booking request 114.

The communication network 13 applies a service quality 1310 determined by the selected quality service 133 to the connection 131 and the face recognition application 15 is operated with the applied service quality 1310.

Applying the service quality 1310 advantageously, comprises assigning a maximum latency, a minimum bitrate or a combination of a maximum latency and a minimum bitrate to the connection and/or causing the application frontend 151 of the face recognition application 15 to adjust a data rate of the transmitted video stream 1120 corresponding to the applied service quality 1310.

The application backend 150 may transmit an authentication result 6 to the application frontend 151 via the connection 131 and the application frontend 151, upon receipt of the authentication result 6, may cause the application frontend 151 to stop transmitting the video stream 1120.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 system
10 backend server
11 terminal device
112 camera
1120 video stream
13 communication network
131 connection
1310 service quality
133 quality service
134 core server
14 transaction application
140 application backend
141 application frontend
15 face recognition application 150 application backend
151 application frontend
3 authentication request
4 face recognition request
5 instruction request
6 authentication result
8 user

The invention claimed is:

1. A method for authenticating a user, comprising:
executing, by a terminal device of the user, an application frontend of a face recognition application;
executing, by a backend server located remote from the terminal device, an application backend of the face recognition application;
upon receipt of a face recognition request from the application backend, causing, by the application frontend, the terminal device to activate a camera of the terminal device;
receiving, by the application frontend, a video stream of a face of the user captured by the camera of the terminal device;
transmitting, by the application frontend, the received video stream to the application backend;
upon receipt of the video stream, extracting, by the application backend, a face characteristic of the user from the received video stream in real-time; and
comparing, by the application backend, the extracted face characteristic with a stored reference face characteristic of the user and authenticating the user based on the extracted face characteristic matching the stored reference face characteristic;
wherein a core server of a communication network, upon transmission of the video stream, selects a quality service for the face recognition application and retrieves data related to the quality service from a quality booking database depending on an IP address of the application backend.

2. The method according to claim 1, wherein the application backend extracts a two-dimensional face characteristic and/or a three-dimensional face characteristic from the video stream.

3. The method according to claim 1, wherein the reference face characteristic is extracted from a reference video stream captured in advance and/or the application backend extracts a plurality of face characteristics simultaneously.

4. The method according to claim 1, wherein the application frontend causes the terminal device to display an instruction instructing the user to perform a required movement of the camera relative to the face.

5. The method according to claim 4, wherein the application backend transmits an instruction request comprising the instruction to the application frontend via a connection, and the application frontend causes the terminal device to display the instruction upon receipt of the instruction request.

6. The method according to claim 1, wherein the extracted face characteristic matching the stored reference face characteristic comprises a similarity between the extracted face characteristic and the stored reference face characteristic exceeding a predetermined minimum similarity.

7. The method according to claim 1, wherein each entry in the quality booking database is created in advance upon an application quality booking request.

8. The method according to claim 1, wherein the communication network applies a service quality determined by the selected quality service to the connection, and the face recognition application is operated with the applied service quality.

9. The method according to claim 8, wherein applying the service quality comprises:
assigning a maximum latency, a minimum bitrate or a combination of a maximum latency and a minimum bitrate to the connection; and/or
causing the application frontend of the face recognition application to adjust a data rate of the transmitted video stream corresponding to the applied service quality.

10. The method according to claim 1, wherein a transaction application, for each transaction, for a random transaction out of a plurality of transactions or for a suspicious transaction, transmits an authentication request to the application backend of the face recognition application, and wherein the application backend of the face recognition application transmits the face recognition request upon receipt of the authentication request.

11. The method according to claim 10, wherein the application backend transmits an authentication result to the application frontend via the connection, and wherein the application frontend, upon receipt of the authentication result, causes the application frontend to stop transmitting the video stream.

12. The method according to claim 1, wherein the connection is provided by a radio access network or a wired network as the communication network.

13. One or more non-transitory computer readable mediums having processor-executable instructions stored thereon for a face recognition application, wherein the face recognition application comprises an application frontend to be executed by a terminal device and an application backend to be executed by a backend server located remote from the terminal device and to be connected to via a communication network, and wherein the processor-executable instructions, when executed, facilitate:
the application frontend, upon receipt of a face recognition request from the application backend, causes the terminal device to activate a camera of the terminal device;
the application frontend receiving a video stream of a face of a user captured by the camera of the terminal device;
the application frontend transmitting the received video stream to the application backend;
the application backend, upon receipt of the video stream, extracting a face characteristic of the user from the received video stream in real-time; and
the application backend comparing the extracted face characteristic with a stored reference face characteristic of the user and authenticating the user based on the extracted face characteristic matching the stored reference face characteristic;
wherein a core server of the communication network is configured to, upon transmission of the video stream, select a quality service for the face recognition application and retrieve data related to the quality service from a quality booking database depending on an IP address of the application backend.

14. A system for authenticating a user, comprising:
a terminal device configured to execute an application frontend of a face recognition application;
a backend server configured to execute an application backend of the face recognition application; and
a communication network configured to provide a connection of the terminal device to the backend server;

wherein the application frontend is configured to, upon receipt of a face recognition request from the application backend, cause the terminal device to activate a camera of the terminal device;

wherein the application frontend is configured to receive a video stream of a face of a user captured by the camera of the terminal device;

wherein the application frontend is configured to transmit the received video stream to the application backend;

wherein the application backend is configured to, upon receipt of the video stream, extract a face characteristic of the user from the received video stream in real-time; and wherein the application backend is configured to compare the extracted face characteristic with a stored reference face characteristic of the user and authenticate the user based on the extracted face characteristic matching the stored reference face characteristic;

wherein a core server of the communication network is configured to, upon transmission of the video stream, select a quality service for the face recognition application and retrieve data related to the quality service from a quality booking database depending on an IP address of the application backend.

* * * * *